United States Patent [19]

Song

[11] Patent Number: 6,020,928
[45] Date of Patent: Feb. 1, 2000

[54] IMAGE PROCESSING APPARATUS AND METHOD FOR REPRODUCING AND RECORDING THEREIN

[75] Inventor: Kweon-eui Song, Suwon, Rep. of Korea

[73] Assignee: Samsung Electronics Co., Ltd., Kyungki-do, Rep. of Korea

[21] Appl. No.: 08/655,444

[22] Filed: May 30, 1996

[30] Foreign Application Priority Data

May 30, 1995 [KR] Rep. of Korea ...................... 95-13967
May 30, 1995 [KR] Rep. of Korea .................... 95-013969
Jun. 12, 1995 [KR] Rep. of Korea ...................... 95-15377

[51] Int. Cl.$^7$ ................................................ H04N 5/445
[52] U.S. Cl. ................... 348/564; 386/97; 386/98
[58] Field of Search .................... 348/556, 565, 348/564, 706, 43, 705, 38; 386/97, 98

[56] References Cited

U.S. PATENT DOCUMENTS

| | | | |
|---|---|---|---|
| 3,051,779 | 8/1962 | Lakjer | 348/38 |
| 4,854,564 | 8/1989 | Hakamada et al. | 358/183 |
| 4,974,073 | 11/1990 | Inova | 348/38 |
| 5,239,420 | 8/1993 | Choi | 360/15 |
| 5,243,476 | 9/1993 | Hong | 360/73.02 |
| 5,280,392 | 1/1994 | Koo | 360/15 |
| 5,323,243 | 6/1994 | Cheon | 358/335 |
| 5,430,553 | 7/1995 | Misono et al. | 358/342 |
| 5,673,090 | 9/1997 | Higuchi et al. | 386/46 |
| 5,748,332 | 5/1998 | Lee | 358/335 |

FOREIGN PATENT DOCUMENTS 0 390 041  1/1990  European Pat. Off. .......... H04B 1/20

*Primary Examiner*—Howard Britton
*Assistant Examiner*—Nhon T. Diep
*Attorney, Agent, or Firm*—Sughrue, Mion, Zinn Macpeak & Seas, PLLC

[57] ABSTRACT

An image processing apparatus in which a double wide television and a double deck videocassette recorder are consolidated and collectively controlled and a method for selecting input/output sources for the image processing apparatus are provided. The image processing apparatus enables various desirable user functions to be performed easily, adding valuable convenience factors to the product. Because the apparatus embodies the double wide television and the double deck videocassette recorder in a single unit, the inconvenience of connecting each video apparatus is eliminated, and expert skills for precise operation are not necessary. Furthermore, the space required to arrange separately each apparatus is is eliminated, allowing space optimization.

16 Claims, 9 Drawing Sheets

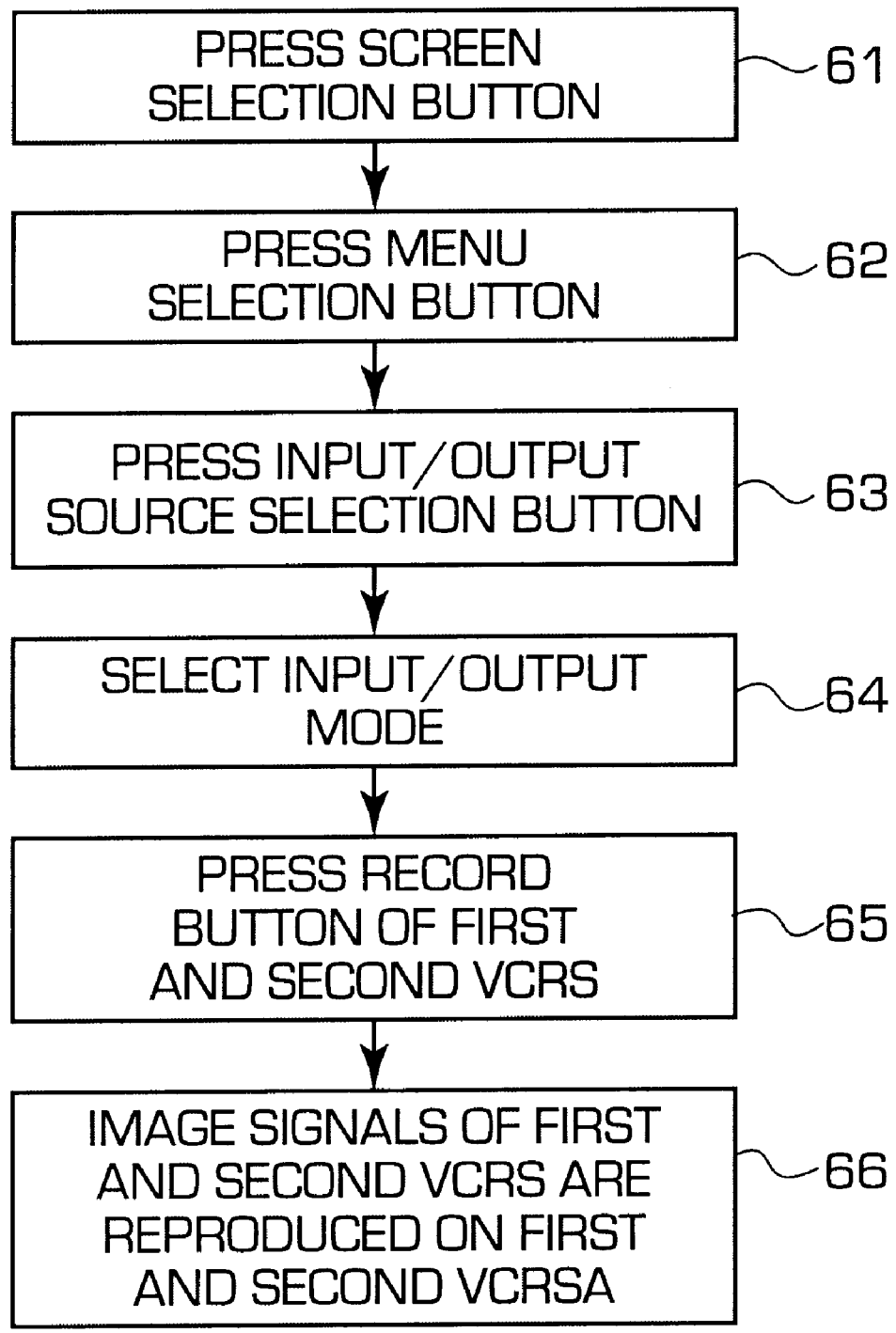

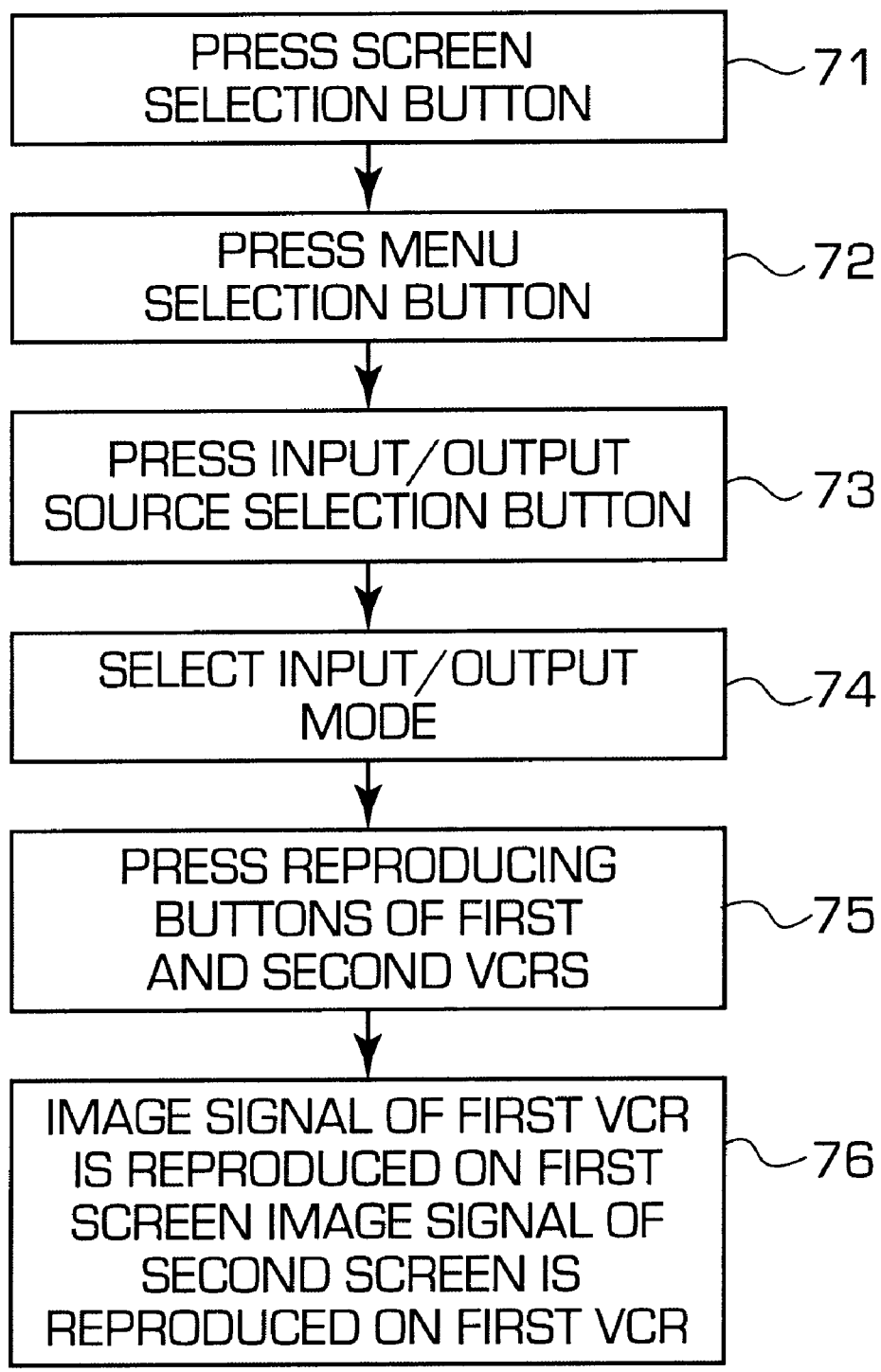

IMAGE PROCESSING APPARATUS AND METHOD FOR REPRODUCING AND RECORDING THEREIN

BACKGROUND OF THE INVENTION

Field of the Invention

The present invention relates to an image processing apparatus, and more particularly, to an apparatus having a double deck videocassette recorder and a double wide television incorporated in a single unit. In addition, a method is provided for reproducing and recording image signals in the image processing apparatus having a double wide television and a double deck VCR.

The double-deck VCR can perform separate reproducing processes and has a "copy" function which duplicates signals from one VCR to the other VCR. Table 1 shows is example configurations of the double-deck VCR.

TABLE 1

| EXAMPLE | FIRST VCR | SECOND VCR |
| --- | --- | --- |
| 1 | VHS | 8 mm |
| 2 | VHS | VHS |
| 3 | 8 mm | 8 mm |
| 4 | VHS | Optical Video Device |
| 5 | 8 mm | Optical Video Device |
| 6 | Optical Video Device | Optical Video Device |

For purposes of explanation, the modes of operation of the VHS-8 mm double-deck VCR will be described in which the first VCR is of the VHS format and the second VCR is of the 8 mm format.

The double-deck VCR can perform various functions as follows. First, a repeat play mode relates to a mode having the function of repeatedly playing tapes on the VHS VCR and 8 mm VCR. In this mode, the number of repeats can be optionally determined. Second, a continuous play mode relates to a mode having the function of playing tapes on respective VCRs sequentially. For example, the apparatus plays a tape in the 8 mm VCR after the tape in the VHS VCR comes to an end. Third, a continuous record mode relates to a mode having the function of continuously recording on the 8 mm VCR after recording on the VHS VCR has run its course. For example, after the tape in the VHS VCR has run out, the 8 mm VCR begins to record.

With a double wide television, a picture of 4:3 aspect ratio is displayed on a wide screen with an aspect ratio of 16:9. Also, when the wide screen is longitudinally divided, two picture signals introduced from different sources may be displayed on the left and right sub-screens at the same time. Thus, a user can simultaneously view a picture reproduced from an external image reproducing apparatus, such as a videocassette recorder or a laser disk player, while viewing a television broadcast.

If the double deck videocassette recorder and the double wide television are electrically connected to each other via a cable, they can perform various operations: the picture signal received by the television and that reproduced by the double deck videocassette recorder can be displayed simultaneously, the received picture signal can be recorded on the videocassette recorder while being displayed on the television screen, and the picture signal reproduced by a videocassette recorder can be recorded on the other videocassette while it is being watched.

However, when recording a picture signal received by the television on a videocassette recorder, an external output terminal of the television must first be connected to an external input terminal of the videocassette recorder using a cable. Then, a channel for receiving the intended picture signal must be selected by operating the television, and the videocassette recorder must be set to a recording mode.

By contrast, when viewing a picture signal reproduced by the videocassette recorder via the television, an external output terminal of the videocassette recorder and an external input terminal of the television must first be connected, or an RF output terminal of the videocassette recorder must be connected to an antenna input terminal of the television. Then, the videocassette recorder must be set to a reproducing mode and the television must be set to operate in an external picture signal receiving mode and set to channel 3 or 4.

Generally, the external input and output terminals is of the component video devices of the image apparatus are located at the rear portion of the main body. To electrically connect the external terminals, the user must reposition the apparatus to gain access to the terminals or enter a narrow area behind the apparatus when the apparatus is placed against a wall. Both alternatives are inconvenient.

In addition, the user must precisely operate each apparatus in a predetermined sequence and possess a certain level of skill to achieve the intended purpose even if the apparatuses are electrically connected. In order to implement various combinations of operations the double wide television and the double deck videocassette recorder, even more cable connections and more skilled operations are required than in the situation where a conventional television is connected to a conventional video tape recorder.

SUMMARY OF THE INVENTION

In order to solve the above problem, it is an object of the present invention to provide an image processing apparatus, wherein a double wide television and a double deck videocassette recorder are consolidated in one body, so that the arrangement optimizes space, and various operations performed by connecting each apparatus with cables can be performed easily.

It is another object of the present invention to provide a method of reproducing and recording signals, adapted to the apparatus.

It is yet another object of the present invention to provide a method of selecting input/output sources adapted to the apparatus.

It is yet still another object of the present invention to provide a method for selecting input/output sources.

To accomplish the first object, there is provided an image processing apparatus comprising: a television signal receiver including two or more tuners for generating IF-processed picture signals by demodulating broadcast signals from a broadcast station, and two or more demodulators connected to the tuners, for demodulating A/V signals from the IF-processed picture signals generated by each tuner; a double deck videocassette recorder including two or more videocassette recorders for simultaneously or separately reproducing an image signal from each videocassette recorder, for simultaneously or separately recording an A/V signal using each videocassette recorder, or for recording signals reproduced from one videocassette recorder to the other videocassette recorder; an A/V signal selector for selectively switching a plurality of A/V signals provided from the television signal receiver and the videocassette recorder and outputting a left/right sub-screen video signal, a left/right sub-screen audio signal, and first and second A/V signals; a video signal processor for double wide processing left and right sub-screen video signals output from the A/V signal selector and outputting the processed video signal to a driver for driving a displaying means; an audio signal processor for surround-processing a left/right audio signal output from the A/V signal selector and outputting the processed audio signal to left and right speakers; a television controller for controlling the television signal receiver, a video signal processor, and an audio signal processor; a double deck videocassette recorder controller for controlling the double deck videocassette recorder; and a master controller for controlling the television controller and double deck videocassette recorder controller in accordance with control commands provided via a key input or a remote control.

To accomplish the second object, there is provided a method of reproducing and recording signals in an image processing apparatus having a double wide television and a double-deck video cassette recorder having first and second VCRs, comprising the steps of: displaying a main menu including the options of a repeated reproducing mode, a continuous reproducing mode and a continuous recording mode on the screen of the double wide television; selecting one of the repeated reproducing, continuous reproducing or continuous recording modes from the displayed main menu; and performing the selected mode.

To accomplish a further object of the present invention, there is provided an apparatus for selecting input/output sources in an image processing apparatus having a double wide television and a double-deck video cassette recorder including a master controller for controlling a television controller, a double-deck video cassette recorder and an audio/video signal selector in order to perform the predetermined operation corresponding to an operation signal received from a user via an operating unit of the master controller, the master controller comprising: a ROM having recorded programs required for various control functions; a master on screen display (OSD) for generating character signals for easily selecting the operating unit; and a microprocessor for controlling the master OSD through programs recorded on the ROM, so that input/output source terminals are selected from menus displayed on an OSD screen, whereupon the operation corresponding to the selected input/output source terminals are performed.

To accomplish a further object of the present invention, there is provided a method of selecting an input/output source of an image processing apparatus having a double wide television. The double wide television has left and right sub-screens, obtained by dividing a wide screen, and also has a double deck video cassette recorder having a first VCR and a second VCR. The method comprises the steps of: displaying a menu screen including the options of a reproducing mode, a recording mode and a combination reproducing/recording mode; and selecting an input/output sources for the mode selected from the menu.

In the double wide television incorporating a double deck VCR according to the present invention, it is preferable, though optional, that selection of the repeated reproducing (play) mode further comprises the step of setting the number of repeats for the repeated play. Selection of the repeated reproducing mode may further comprise the returning to the menu screen when the repeated reproducing mode is canceled. Upon selection of the continuous reproducing mode, image signals recorded on tapes loaded in the first and second VCR are sequentially played and displayed on the screen of the television. Upon selection of the continuous record mode, image signals displayed on a screen of the television are sequentially recorded on tapes loaded in the first and second VCRs.

In the method of selecting input/output sources for a double wide television incorporating a double-deck VCR, several combinations of input and output sources for simultaneous recording and viewing of different programs are possible. It is preferable that upon selection of the reproducing mode from the options displayed, image signals recorded on a tape loaded in the first VCR are reproduced on the left sub-screen and image signals recorded on a tape loaded in the second VCR are reproduced on the right sub-screen. Another input/output source combination includes the case where image signals recorded on a tape loaded on the first VCR are reproduced on the left sub-screen, and external input signals are reproduced on the right sub-screen. Upon selection of the recording mode from the options displayed, image signals displayed on the left sub-screen are recorded on a tape loaded in the first VCR, and image signals displayed on the right sub-screen are recorded on a tape loaded in the second VCR. Upon selection of the combination of reproducing/recording mode from the options displayed, television broadcast signals displayed on the left and right sub-screens are viewed and, at the same time, external input image signals are recorded on tapes loaded in the first and second VCRs. Other possible sets of input/output source combinations in the combination mode includes the cases where 1) image signals recorded on a tape loaded in the first VCR are displayed on the left sub-screen and television broadcast signals displayed on the right screen are recorded on a tape loaded in the second VCR; 2) external image signals are recorded on a tape loaded in the first or second VCR and external image signals from another source are reproduced on the left or right sub-screen; 3) image signals recorded on a tape loaded in the first VCR are reproduced on the left sub-screen and, at the same time, the image signals are recorded on a tape loaded in the second VCR; and 4) two separate external image signals are reproduced on the left and right sub-screens, respectively, and, at the same time, the reproduced image signals are recorded on tapes loaded in the first and second VCRs.

BRIEF DESCRIPTION OF THE DRAWINGS

The above objects and advantages of the present invention will become more apparent by a detailed description of a preferred embodiment thereof with reference to the attached drawings in which:

FIG. 8 is a flowchart for illustrating the recording mode shown in FIG. 6; and

FIG. 9 is a flowchart for illustrating the reproducing mode and recording mode shown in FIG. 6.

DETAILED DESCRIPTION OF THE INVENTION

Figure 1:
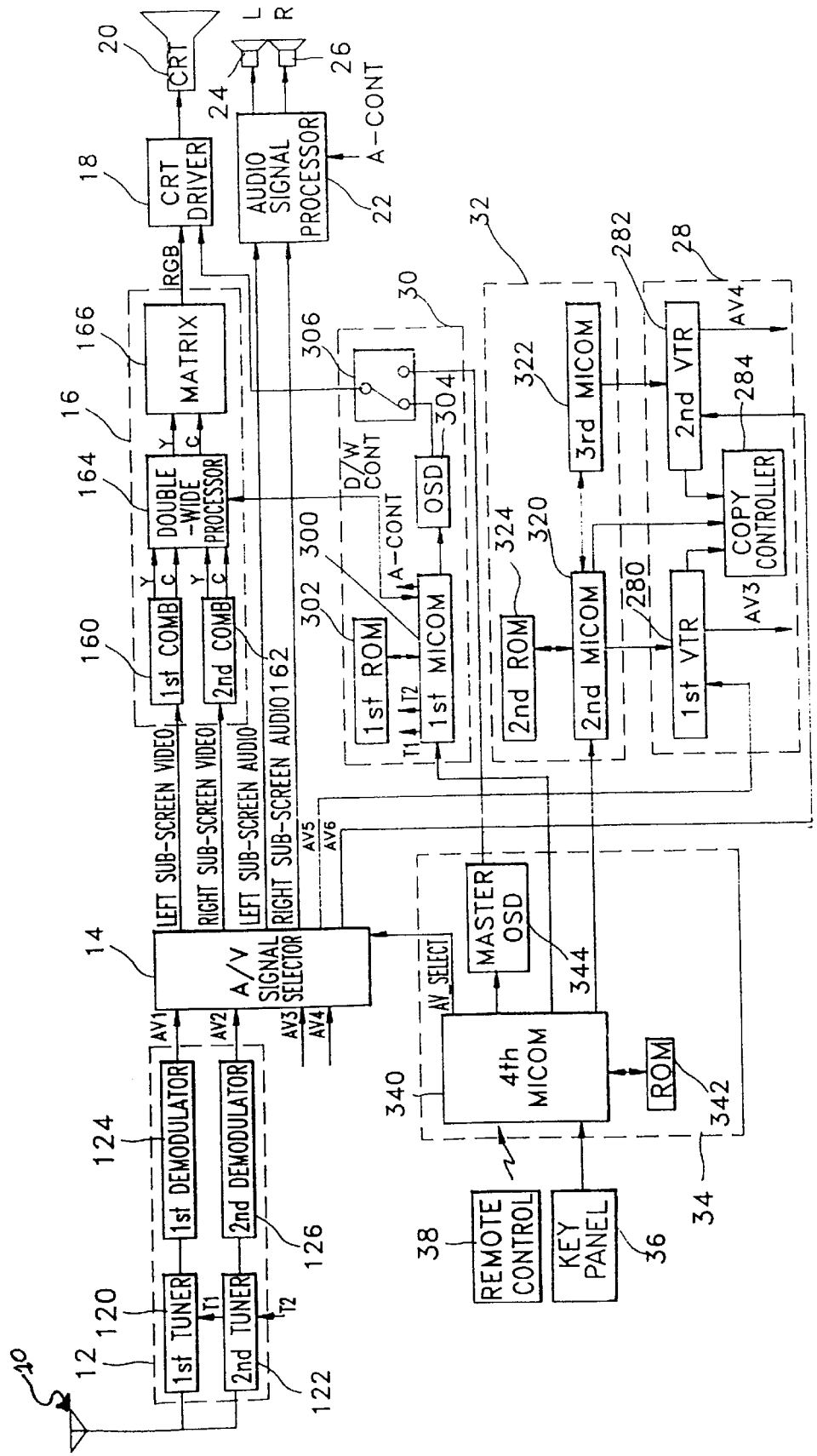
FIG. 1 is a block diagram showing the configuration of an image processing apparatus according to the present invention.

Referring to FIG. 1, the image processing apparatus of the present invention includes an antenna 10, a television signal receiver 12, an audio/video (A/V) signal selector 14, a video signal processor 16, a CRT driver 18, a CRT 20, an audio signal processor 22, left and right speakers 24 and 26, a double deck videocassette recorder 28, a television controller 30, a double deck videocassette recorder controller 32 and a master controller 34. The television signal receiver 12 includes the first and second tuners 120 and 122 for generating IF-processed picture signals for a broadcast signal introduced via the antenna 10. The receiver also includes the first and second demodulators 124 and 126 for generating first and second audio/video signals by demodulating the IF-processed picture signal generated from the first and second tuners 120 and 122.

The video signal processor 16 includes: first and second comb filters 160 and 162 for receiving video signals of the left and right sub-screens and for separating the received signal into a first luminance/chrominance signal and a second luminance/chrominance signal, respectively; a double wide (D/W) processor 164 for D/W-processing the first luminance/chrominance signal and the second luminance/chrominance signal and outputting the result as a third luminance/chrominance signal; and a matrix 166 for generating a RGB signal by performing matrix-processing on the third luminance/chrominance signal output from the D/W processor 164.

The double deck videocassette recorder 28 includes first and second videocassette recorders 280 and 282 for generating third and fourth audio/video signals AV3 and AV4 or for recording fifth and sixth audio/video signals AV5 and AV6 output from the A/V signal selector 14. The double deck videocassette recorder also includes and a copy controller 284.

The television controller 30 includes a first microcomputer (MICOM) 300, a first ROM 302, an OSD 304, and an OSD selector 306.

The double deck videocassette recorder controller 32 includes a second microcomputer 320, a third microcomputer 322, and a second ROM 324.

The master controller 34 comprises a master microcomputer 340, a third ROM 342 and a master OSD 344.

The operation of the image processing apparatus shown in FIG. 1 will now be explained in detail. The television signal receiver 12 demodulates the broadcast signal introduced via the antenna 10 and outputs first and second A/V signals AV1 and AV2. The double deck videocassette recorder 28 outputs third and fourth A/V signals AV3 and AV4, each of which is produced from the first and second VCRs 280 and 282.

The A/V signals AV1, AV2, AV3 and AV4 are provided to the A/V signal selector 14. The A/V signal selector 14 selectively combines two of the plurality of A/V signals received via its input terminals, and outputs the results as left and right sub-screen video signals, left and right sub-screen audio signals, and fifth and sixth A/V signals AV5 and AV6, respectively.

Figure 2:
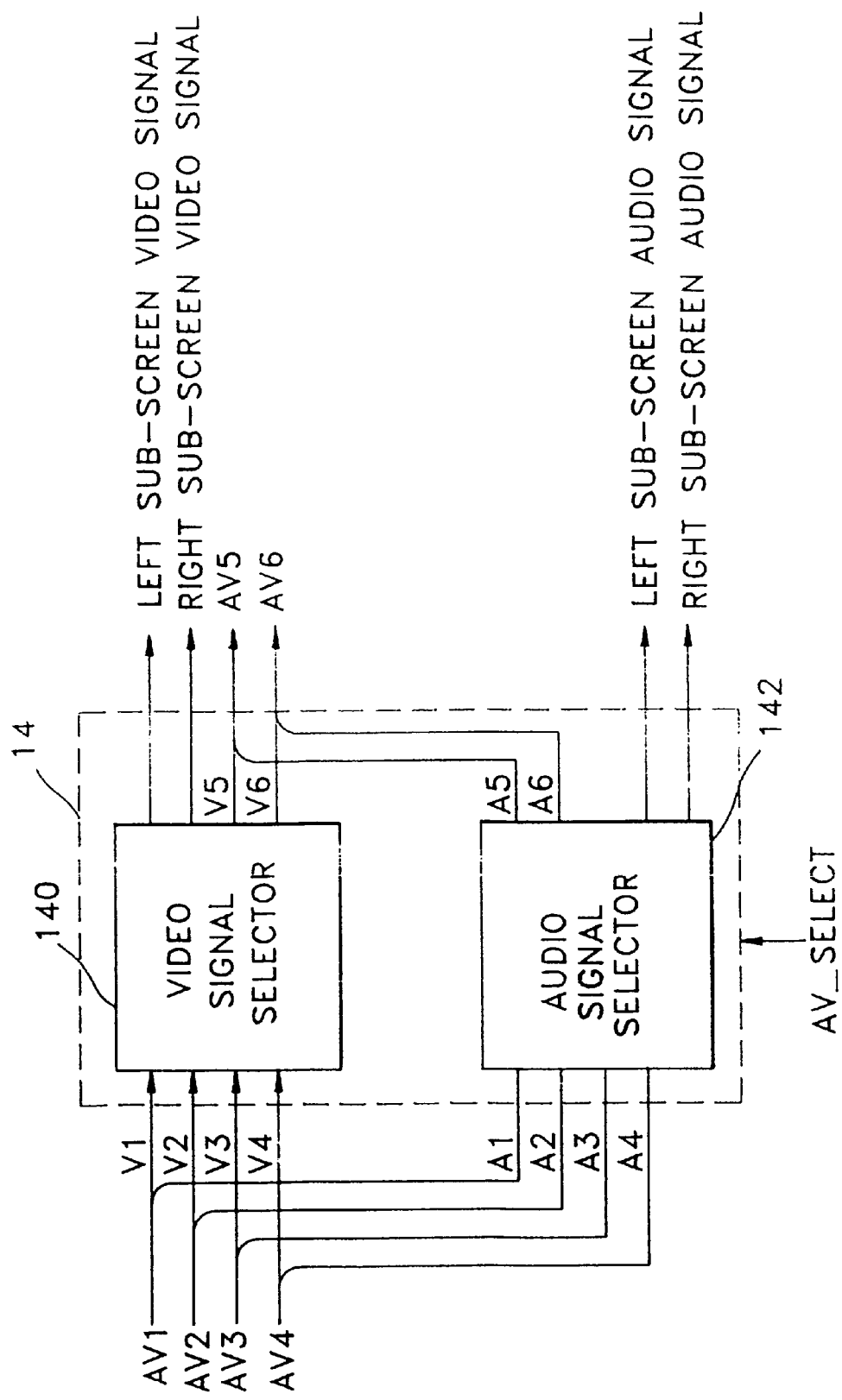
FIG. 2 is a block diagram of the audio/video signal selector of the apparatus shown in FIG. 1 according to a preferred embodiment of the present invention.

FIG. 2 is a detailed block diagram showing the configuration of the A/V signal selector 14 shown in FIG. 1. The A/V signal selector 14 includes a video signal selector 140 and an audio signal selector 142. First, the A/V signals AV1, AV2, AV3, and AV4 are split into respective audio and video signals A1, A2, A3, A4 and V1, V2, V3, V4. The video signal selector 140 receives the video signals V1, V2, V3, and V4, selects two of them, and outputs the selected video signals as left and right sub-screen video signals, and video signals V5 and V6. The output video signals are determined according to a selection signal (AV_SELECT) which is output from the television controller 30.

The audio signal selector 142 receives audio signals A1, A2, A3, and A4, selects two of them, and outputs the selected audio signals corresponding to the selected video signals as left and right sub-screen audio signals, and audio signals A5 and A6.

In order to make the apparatus more compatible, external A/V signals may be additionally received or a separate A/V signal may be generated for an external output.

Figure 3:
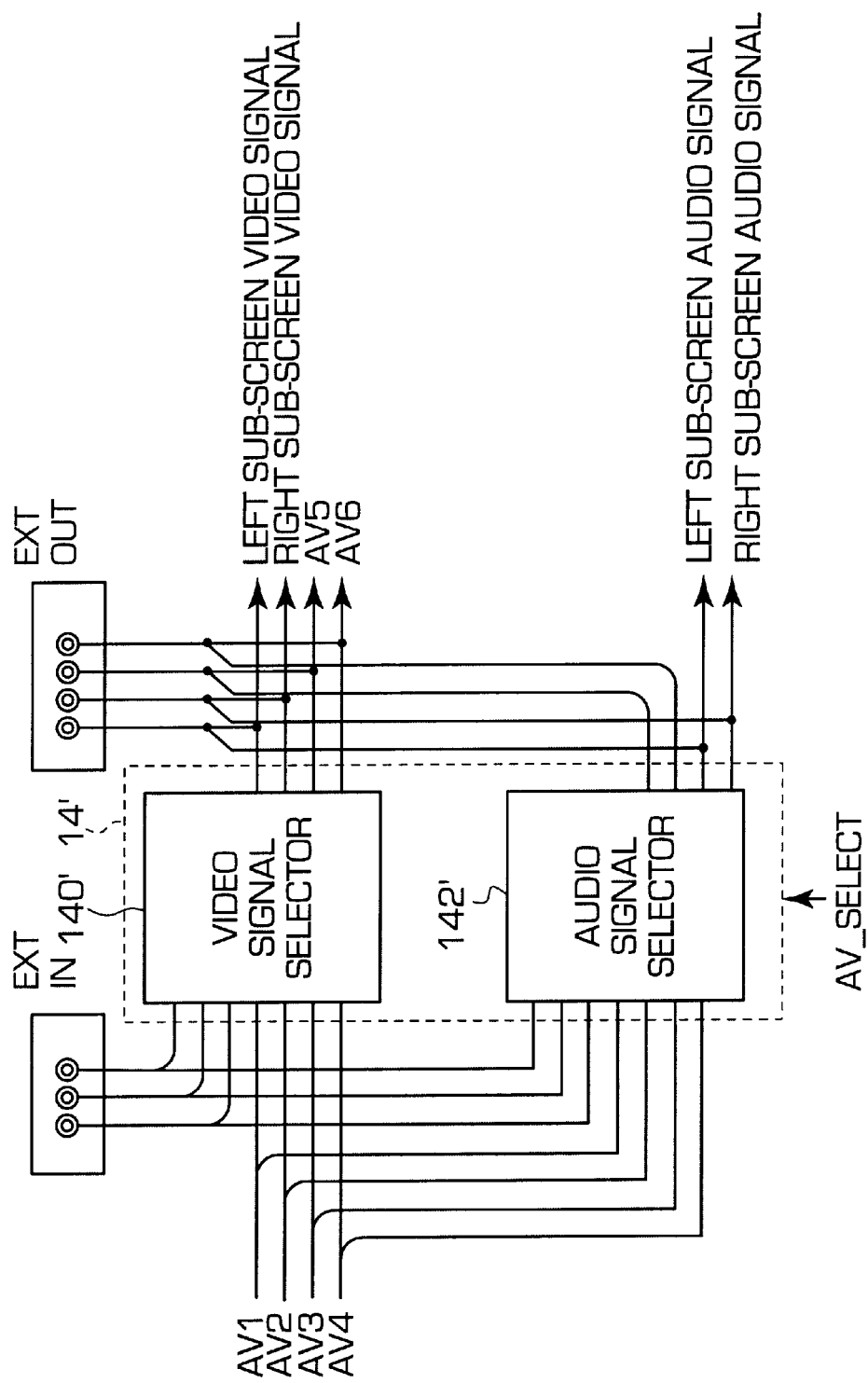
FIG. 3 is a block diagram of the audio/video signal selector of the apparatus shown in FIG. 1 according to another preferred embodiment of the present invention.

FIG. 3 is a block diagram showing the configuration of the A/V signal selector 14 shown in FIG. 1 according to another preferred embodiment of the present invention. The A/V signal selector shown in FIG. 3 further includes additional A/V signal input terminals for external A/V signals. As is well known, the number of bits of A/V selection signal (AV_SELECT) will increase due to the increase of number of possible combination sets of input signals.

The video signal processor 16 D/W-processes the left and right sub-screen video signals provided by the A/V signal selector 14 and outputs the result as one picture signal. In order to simultaneously display two picture signals on one screen, the horizontal and vertical scanning periods of each video signal should be matched prior to combining the horizontal and vertical scanning periods of the combined picture signal. Here, it is assumed that the horizontal and vertical scanning periods of the two video signals being combined are the same. If the horizontal and vertical scanning periods are different, additional processing will be required. The technology related to this processing to match scanning periods has been applied in converters for converting signals from NTSC to PAL standards and from HDTV to NTSC standards.

The scanning period of the combined picture signal is controlled in a memory. For this purpose, the video signal is divided into luminance/chrominance signals, digitally converted, and then recorded in the memory. The scanning period of the output picture signal can be determined by controlling the speed at which the digitized signal is read-out from the memory.

Figure 4:
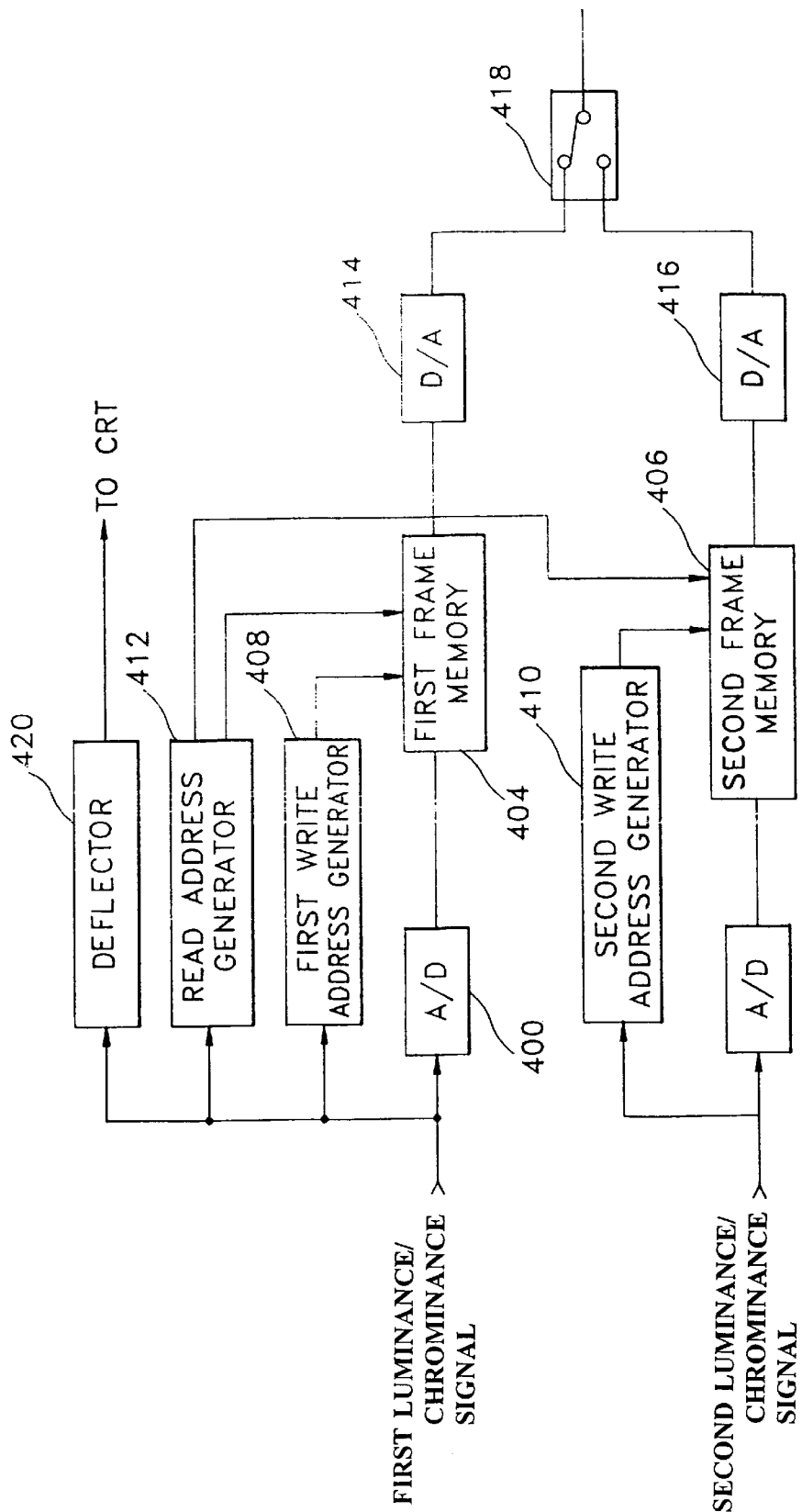
FIG. 4 is a block diagram of the D/W processor of the apparatus shown in FIG. 1.

FIG. 4 is a detailed block diagram showing the configuration of the D/W processor 164 shown in FIG. 1. The D/W processor 164 shown in FIG. 4 includes first and second analog-to-digital (A/D) converters 400 and 402, first and second frame memories 404 and 406, first and second write address generators 408 and 410, a read address generator 412, first and second digital-to-analog (D/A) converters 414 and 416, a left/right sub-screen switch 418 and a deflector 420.

The first and second write address generators 408 and 410 generate write addresses whose writing speeds are the same as the scanning speed of the left and right sub-screen video signals. The video signals digitally converted by first and second A/D converters 400 and 402 are written to the first and second frame memories 404 and 406. Here, the writing speeds of the first and second frame memories 404 and 406 are the same as the scanning speeds of the left and right sub-screen video signals.

The read address generator 412 generates a read address having a reading speed that is twice the writing speed of the left/right sub-screen video signals. Thus, the reading speeds of the first and second frame memories 404 and 406 are twice the writing speed of the left and right sub-screen video signals.

The horizontal scanning period of the picture signal is divided. The video signal written in the first frame memory 404 is read out during the first half, and the video signal written in second frame memory 406 is read out during the second half. When each video signal is read out at a speed that is twice the writing speed of each video signal, two video signals are output while being combined into one picture signal.

Figure 5:
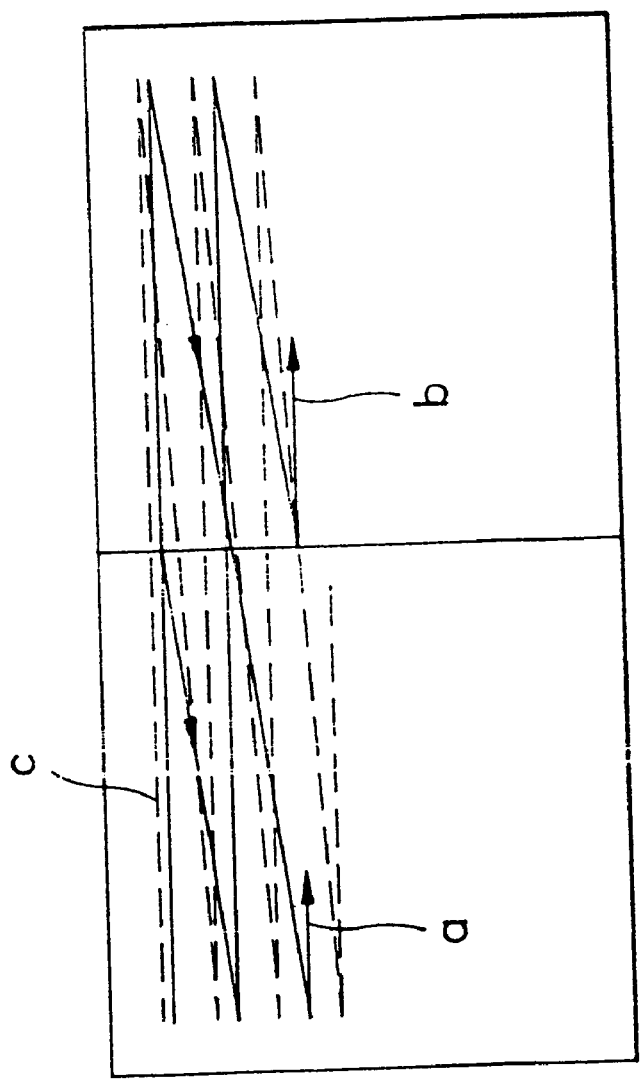
FIG. 5 is a diagram schematically illustrating the operation of the video signal processor shown in FIG. 4.

FIG. 5 is a diagram schematically illustrating the writing and reading operations of the first and second frame memories 404 and 406. In FIG. 5, solid lines a and b represent the writing operation, and dashed line c represents the reading operation. Video signals, represented by solid lines a and b, are written separately the frame memories 404 and 406. Here, the writing speed is the same as the scanning speed of each video signal. After the video signal is written in the two frame memories 404 and 406, the video signal is read out continuously, at a speed twice that of the writing speed, represented by dashed line c. Thus, the speed for writing out each video signal is the same as that for continuously reading out two signals, and a video signal can be obtained by combining two video signals.

The left/right sub-screen switch 418 shown in FIG. 4 changes the switching sequence of the signal being read out from the first and second frame memories 404 and 406, to change the sub-screens being scanned.

The CRT driver 18 shown in FIG. 1 displays the picture signal by driving the CRT 20 using RGB signals output from the video signal processor 16.

The audio signal processor 22 provides the left/right sub-screen audio signal provided from the A/V signal selector 14 to the left and right speakers 24 and 26 by performing speaker/headphone selection processes. Here, it is possible to select the output mode of the audio signal. As specific examples, the audio signal corresponding to the video signal of the left and right sub-screen video signals can be output to the left and right speakers, respectively, or the audio signal corresponding to the video signal of the left sub-screen can be output to the left and right speakers and the audio signal corresponding to the video signal of the right sub-screen can be output to the headphone output terminals, or vice versa.

The double deck videocassette recorder 28 provides the A/V signal reproduced from two VCRs 280 and 282 to the A/V signal selector 14, separately or simultaneously records the fifth and sixth A/V signals provided from the A/V signal selector 14, or records the A/V signal from one VCR onto the other VCR.

Here, the first VCR 280 is a videocassette recorder adopting the VHS format and the second VCR 282 is a videocassette recorder adopting the 8 mm format. With the latter format, the 8 mm tape widely used in the video cameras can be used. Additionally, a picture signal recorded in either 8 mm or VHS format can be recorded while being converted into the other format.

The television controller 30 controls the tuners 120 and 122 and the video signal processor 16 in response to commands input by the operation of the key input portion 36 or the remote control 38. The television controller controls the channel selecting operations of the tuners 120 and 122 by generating first and second tuner control signals T1 and T2. Two channels can be viewed simultaneously by designating different broadcast channels for each tuner.

In addition, the television controller 30 generates a D/W control signal (DB/WIDE) to control the video signal processor 16.

A program required for controlling the television is stored in the first ROM 302 of the television controller 30. The first microcomputer 300 performs the control operation using the program stored in the first ROM 302 and generates character signals for a user interface via an on screen display, OSD 304.

The OSD switch 306 provides one OSD signal from either OSD 304 or master OSD 344 of the master controller 34 to the matrix 166 of the video signal processor 16.

The CRT driver 18 drives the CRT 20 in accordance with the signal formed by overlapping OSD and RGB signals from the matrix 166.

The double deck videocassette recorder controller 32 includes two microcomputers 320 and 322, corresponding to VCRs 280 and 282. Here, the operation of the third microcomputer 322 for controlling the second VCR 282 is subordinate to the second microcomputer 320 for controlling the first VCR 280. This arrangement results because the second microcomputer 320 is directly controlled by the master controller 34. However, the third microcomputer 322 receives the command of the master controller 34 via the second microcomputer 320 or operates according to the control of the second microcomputer 320.

Since the frequency of use of the second VCR 282, adopting the 8 mm format and generally used with video cameras, is typically lower than that of the first VCR 280 adopting the VHS format, this arrangement reduces the load of the master controller 34. Specifically, the second microcomputer 320 controls the third microcomputer 322.

The master controller 34 controls the television controller 30, the double deck videocassette recorder controller 32, and the A/V signal selector 14 ensuring the operations thereof in accordance with the commands input via the key input portion 36 or the remote controller 38.

The third ROM 342 of the master controller 34 stores programs required for various controlling processes. A fourth microcomputer 340 performs controlling operations using the programs of the third ROM 342 and generates character signals for a user interface, for example a selection menu, via a master OSD 344.

The master controller 34 controls the A/V signal selector 14 by generating an audio/video selection signal (AV_SELECT), so that a proper signal suitable for a predetermined operation can be provided to the video signal processor 16, the audio signal processor 22 and the double deck videocassette recorder 28.

Figure 6:
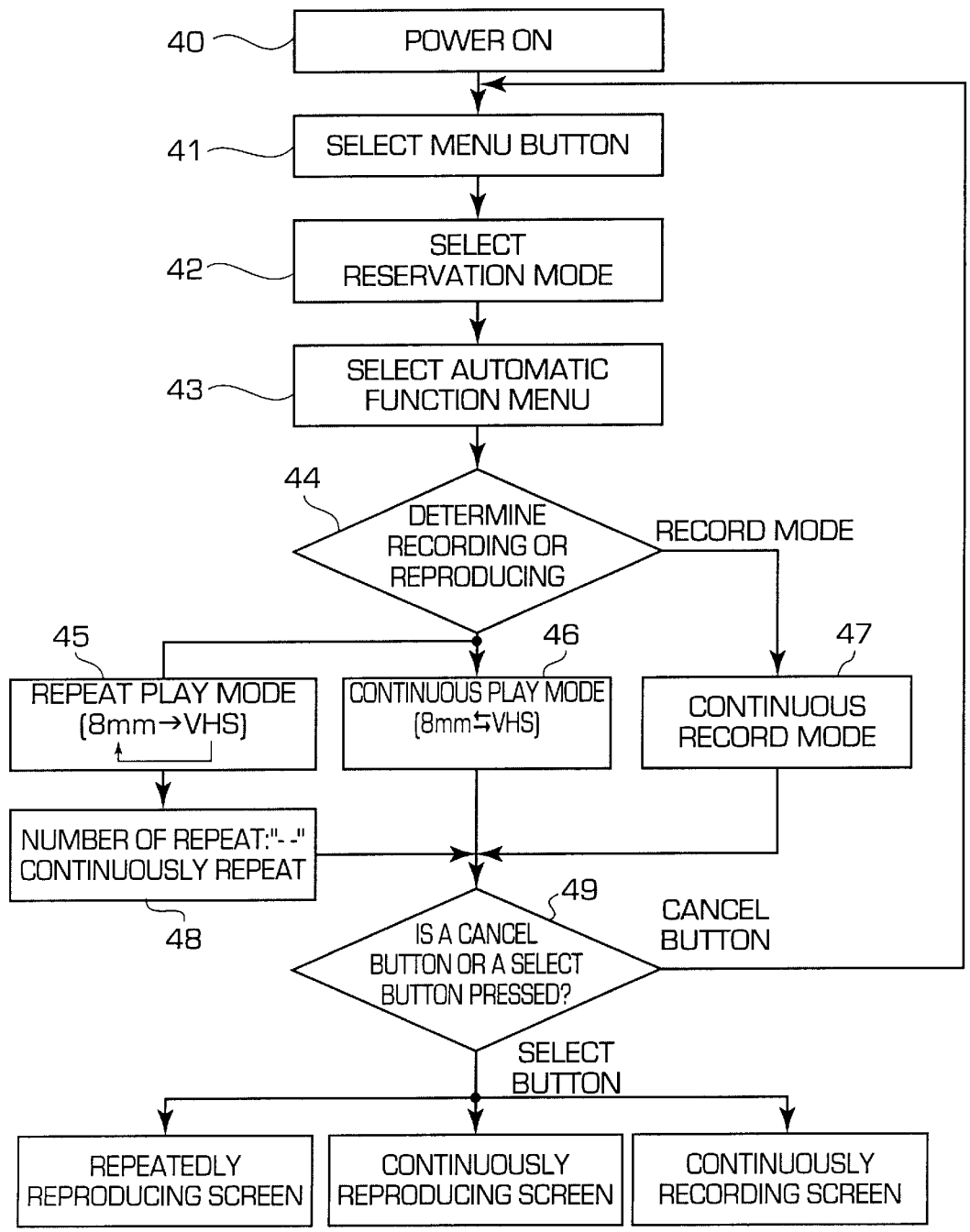
FIG. 6 is a flowchart illustrating the operation of the apparatus according to an embodiment of the present invention.

Since there are many input and output signals in the double wide television encasing a double deck videocassette recorder, the user interface via the OSD is emphasized for properly selecting the correct input and output signals. Thus, for implementing the user interface function, the master OSD 344 is installed specifically for the exclusive use by the master controller 34. FIG. 6 is a flowchart showing the reproducing and recording method according to an embodiment of the present invention. Here, the process of operating in the repeat play mode, continuous play mode, and continuous record mode will be described assuming a VHS VCR for the first VCR and an 8 mm VCR for the second VCR.

In step 40, power is provided to the double wide television incorporating a double-deck VCR. Then, in step 41, a menu button is pressed. In step 42, a program mode is selected. In step 43, an automatic function menu is selected. A determination of whether to record or play is made in step 44 from the automatic function menu. According to the selection in step 44, the apparatus goes into the repeat play mode (step 45), the continuous play mode (step 46), or the continuous record mode (step 47). In the repeat play mode, the number of repeats can optionally be determined. In step 45, a tape from one VCR is played repeatedly or tapes from each VCR are repeatedly played on the left and right sub-screens, respectively. In step 46, the tape of the 8 mm VCR continues to play after the tape of the VHS VCR is played. In step 47, assuming a VHS VCR for the first VCR and an 8 mm VCR for the second VCR, a tape continues to record on the tape of the 8 mm VCR after the tape of the VHS VCR has run out of tape for recording additional information. During steps 45, 46 and 47, when a cancel button is pressed, the OSD returns to the initial menu screen (step 49) and the process returns to step 41.

It is well known that a number key of a remote controller and a separate key can be used for the method of selecting the modes described above. It is also well known that a television being incorporated into a double-deck VCR can be replaced with a conventional television.

Figure 7:
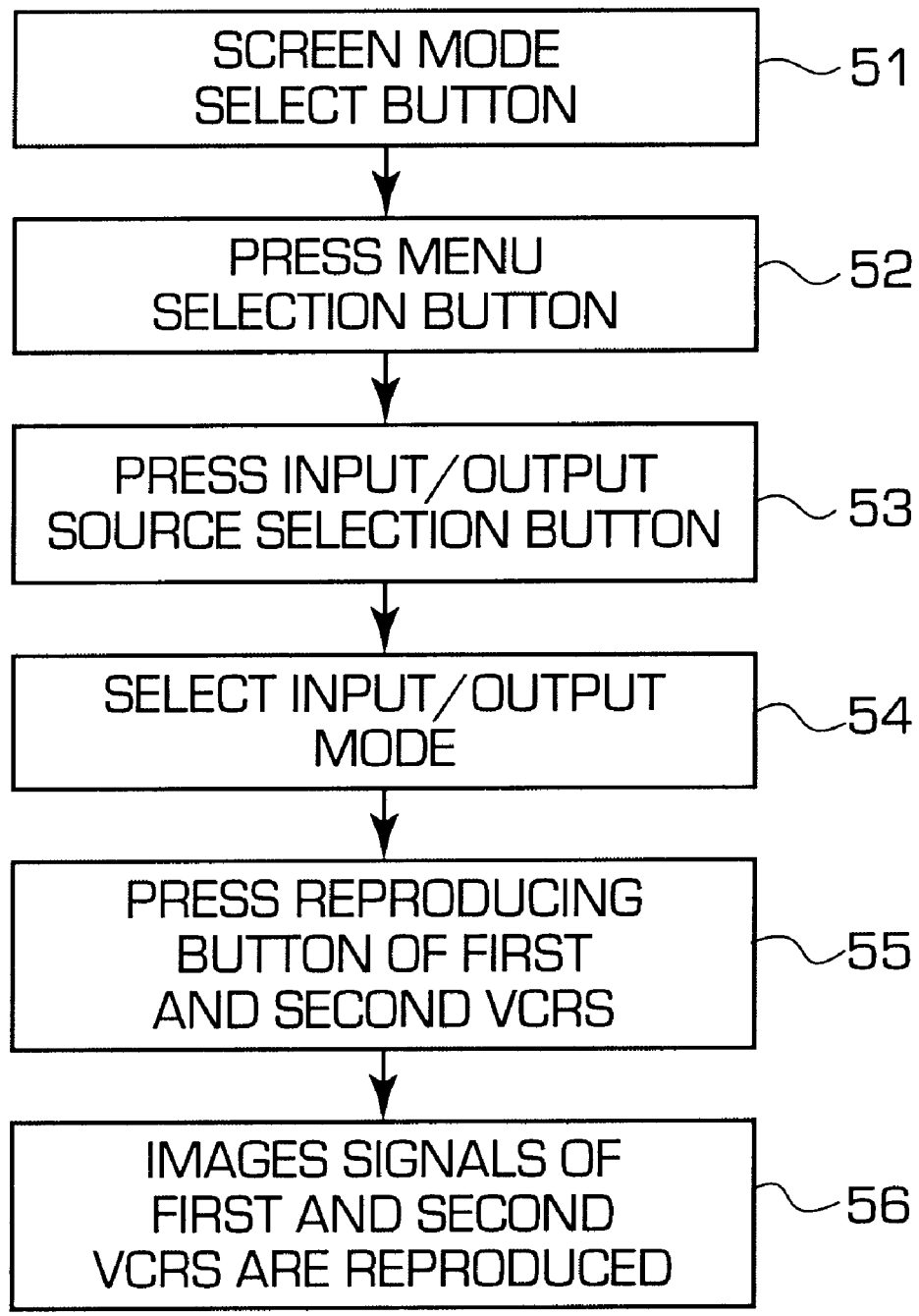
FIG. 7 is a flowchart for illustrating the reproducing mode shown in FIG. 6.

FIG. 7 is a flowchart for illustrating the operation of a play mode according to the present invention. Here, a method of playing tapes inserted into the first and second VCRs and displaying video outputs on the left and right sub-screens of a double wide television will be described.

First, in step 51, a screen selection is made to determine whether a single wide screen or a screen having two sub-screens will be used. Then, a menu selection button is pressed in step 52. After that, in step 53, an input/output source selection mode button is pressed. In order to reproduce an image signal from the first VCR on one sub-screen of the double wide television and an image signal from the second VCR on the other sub-screen thereof, the input/output source mode is selected in step 54. Finally, reproduction buttons of the first and second VCRs are pressed in step 55. An image signal from the first VCR is reproduced on one sub-screen of the double wide television and an image signal from the second VCR is reproduced on the other sub-screen thereof after step 55.

FIG. 8 is a flowchart for illustrating the operation in a record mode according to the present invention. Here, a method of recording image signals output to the right and the left sub-screens of a double wide television on tapes inserted into the first and second VCRs will be described.

First, in step 61, a screen selection is made to determine whether a single wide screen or a screen having two sub-screens will be used. In step 62, a menu selection button is pressed. Then, an input/output source mode selection button is pressed in step 63. In order to record an image signal on one sub-screen of the double wide television on the first VCR and an image signal on the other sub-screen on the second VCR, an input/output source mode is selected in step 64. Finally, record buttons of the first and the second VCRs are pressed in step 65. Image signals on one sub-screen of the double wide television are recorded on the first VCR and image signals on the other sub-screen are recorded on the second VCR in step 66.

FIG. 9 is a flowchart for illustrating the operation of a record/play mode according to the present invention. Here, in the double wide television incorporating a double-deck VCR, a method of playing one VCR on one sub-screen of the double wide television and recording television broadcast signals reproduced on the other sub-screen on the other VCR will be described.

First, in step 71, a screen selection button is made to determine whether a single wide screen will be used or whether the screen will be split into two sub-screens. For the record/play mode the double-screen mode should be selected. In step 72, a menu selection button is pressed. Then, an input/output source mode selection mode is pressed in step 73. After step 73, in order to reproduce an image of the one VCR on one screen of the double wide television and to record television broadcast signals reproduced on the other screen on the other VCR, an input/output source mode is selected in step 74. Then, a play button of the recording deck is pressed and a record button of the other deck is pressed in step 75. Finally, in step 76, an image produced by one VCR is played on one sub-screen of the double wide television while television broadcast signals displayed on the other sub-screen are recorded on the other VCR.

As described above, an image processing apparatus in which a double wide television and a double deck video-cassette recorder are included, to be collectively controlled therein, can be obtained. This enables various desirable functions to be performed easily, adding valuable convenience features to the product. Also, because the image processing apparatus described above embodies a double wide television and a double deck videocassette recorder in a single unit, the inconvenience of connecting each apparatus is eliminated and expert skills to operate the apparatus are not required. Furthermore, the space required to arrange separately each apparatus is eliminated, allowing space optimization.

What is claimed is:

1. An image processing apparatus comprising:
    a television signal receiver, said receiver further comprising:
        two or more tuners for generating IF-processed picture signals from received broadcast signals, and two or more demodulators, each connected to a respective tuner, for demodulating A/V signals from the IF-processed picture signals generated by each tuner;
    a double deck videocassette recorder including two videocassette recorders for selectively reproducing and recording signals including simultaneously or separately reproducing an image signal from A/V signals reproduced from at least one videocassette recorder, simultaneously or separately recording A/V signals using at least one videocassette recorder, and recording an image signal reproduced from one videocassette recorder to the other videocassette recorder;
    an A/V signal selector for selectively switching A/V signals provided from said television signal receiver and said double deck videocassette recorder for outputting left and right sub-screen video signals and left and right sub-screen audio signals; and for outputting A/V signals, wherein said A/V signals are selectively supplied to at least one of respective first and second videocassette recorders of said double deck videocassette recorder;
    a video signal processor for double wide processing the left and right sub-screen video signals output from said A/V signal selector and for outputting the double wide processed video signal to a driver for driving a displaying means;
    an audio signal processor for surround-processing the left and right audio signals output from said A/V signal selector and outputting the surround processed audio signal to left and right speakers;

a television controller for controlling said television signal receiver, said video signal processor, and said audio signal processor;

a double deck videocassette recorder controller for controlling said double deck videocassette recorder; and a master controller for controlling said television controller and double deck videocassette recorder controller in accordance with control commands provided via a key panel or a remote control.

2. A method of reproducing and recording in an image processing apparatus having a double wide television and a double-deck video cassette recorder having first and second VCRs, comprising the steps of:

displaying a main menu including the options of a repeated reproducing mode, a continuous reproducing mode and a continuous recording mode on a screen of said double wide television;

selecting one of said repeated reproducing, continuous reproducing or continuous recording modes from said displayed main menu; and performing the selected mode.

3. The method of reproducing and recording in an image processing apparatus having a double wide television and a double-deck video cassette recorder having first and second VCRs according to claim 2, wherein in said selecting step, said selecting step further comprises the step of setting the number of repeats when said repeated reproducing mode is selected.

4. The method of reproducing and recording in an image process apparatus having a double wide television and a double-deck video cassette recorder having first and second VCRs according to claim 2, wherein in said selecting step, said selecting step further comprises the step of returning to said menu screen displaying step when the repeated reproducing mode is canceled.

5. The method of reproducing and recording in an image processing apparatus having a double wide television and a double-deck video cassette recorder having first and second VCRs according to claim 2, wherein upon selection of said continuous reproducing mode, image signals recorded on tapes loaded in respective first and second VCRs are output and displayed on the screen of said television, such that when the tape in one of said first and second VCRs reaches an end, the other VCR outputs and displays image signals on said television.

6. The method of reproducing and recording in an image processing apparatus having a double wide television and a double-deck video cassette recorder having first and second VCRs according to claim 2, wherein upon selection of said continuous recording mode, image signals displayed on a screen of said television are recorded on tapes loaded in respective first and second VCRs such that when the tape in one of said first and second VCRs reaches an end, the other VCR records image signals displayed on said television.

7. An apparatus for selecting input and output sources for A/V signals in an image processing apparatus having a double wide television and a double-deck video cassette recorder comprising:

a master controller for controlling a television controller, a double-deck video cassette recorder controller and an audio/video signal selector to perform an operation corresponding to an order received from a user via an operating unit of said master controller, said master controller comprising:

a ROM for storing recorded programs required for control functions;

a master on screen display (OSD) for generating character signals corresponding to input and output sources for A/V signals for selection by the user via the operating unit; and a microprocessor for controlling said master OSD via programs stored on said ROM, and for performing the operation corresponding to the character signals generated on said master OSD in accordance with the input and output sources selected by the user.

8. A method of selecting input and output sources for A/V signals in a double wide television, having left and right sub-screens and incorporating a double-deck video cassette recorder having a first VCR and a second VCR, comprising the steps of:

displaying a menu screen including at least the options of a reproducing mode, a recording mode and a combination reproducing/recording mode;

selecting a mode from said menu; and connecting input and output sources based on the said selected mode.

9. The method of selecting input and output sources for A/V signals in a double wide television, having left and right sub-screens and incorporating a double-deck video cassette recorder having a first VCR and a second VCR, according to claim 8, wherein upon selection of said reproducing mode, image signals recorded on a tape loaded in said first VCR are reproduced on the left sub-screen and image signals recorded on a tape loaded in said second VCR are reproduced on the right sub-screen.

10. The method of selecting input and output sources for A/V signals in a double wide television having left and right sub-screens and incorporating a double-deck video cassette recorder having a first VCR and a second VCR according to claim 8, wherein upon selection of said reproducing mode, image signals recorded on a tape loaded on said first VCR are reproduced on the left sub-screen and external input signals are reproduced on the right sub-screen.

11. The method of selecting input and output sources for A/V signals in a double wide television having left and right sub-screens, and incorporating a double-deck video cassette recorder having a first VCR and a second VCR according to claim 8, wherein upon selection of said recording mode, image signals displayed on the left sub-screen are recorded on a tape loaded in said first VCR and image signals displayed on the right sub-screen are recorded on a tape loaded in said second VCR.

12. The method of selecting input and output sources for A/V signals in a double wide television having left and right sub-screens, and incorporating a double-deck video cassette recorder having a first VCR and a second VCR according to claim 8, wherein upon selection of said combination reproducing/recording mode, a first set of image signals are displayed on at least one of the left and right sub-screens and, at the same time, a second set of image signals are recorded by at least one of said first and second VCRs.

13. The method of selecting an input and output sources for A/V signals in a double wide television having left and right sub-screens and incorporating a double-deck video cassette recorder having a first VCR and a second VCR according to claim 12, wherein said first set of image signals comprises image signals recorded on a tape loaded in said first VCR which are reproduced and are displayed on one of the left and right sub-screens and said second set of image signals comprises broadcast signals displayed on the other screen and said second set of image signals are recorded on a tape loaded in said second VCR.

14. The method of selecting input and output sources for A/V signals in a double wide television having left and right sub-screens, and incorporating a double-deck video cassette recorder having a first VCR and a second VCR according to claim 12, wherein the second set of image signals are recorded on a tape loaded in one of said first and second VCRs and said first set of image signals are reproduced on one of the left and right sub-screens.

15. The method of selecting input and output sources for A/V signals in a double wide television having left and right sub-screens and incorporating a double-deck video cassette recorder having a first VCR and a second VCR according to claim 12, wherein said first set of image signals comprises signals recorded on a tape loaded in said first VCR which are reproduced on the left sub-screen and, at the same time, said second set of image signals comprise said reproduced image signals which are recorded on a tape loaded in said second VCR.

16. The method of selecting input and output sources for A/V signals in a double wide television having left and right sub-screens and incorporating a double-deck video cassette recorder having a first VCR and a second VCR according to claim 12, wherein said first set of signals comprise two separate external image signals which are reproduced on the left and right sub-screens, respectively, and said second set of image signals comprise said reproduced image signals which are respectively recorded on tapes loaded in said first and second VCRs.

\* \* \* \* \*